(12) United States Patent
Ryan et al.

(10) Patent No.: US 9,592,601 B2
(45) Date of Patent: Mar. 14, 2017

(54) ERGONOMIC HANDLE

(71) Applicant: Columbian Home Products, LLC, North Barrington, IL (US)

(72) Inventors: Delvin Ryan, Barrington Hills, IL (US); Lorenzo Porcelli, Tarry Town, NY (US)

(73) Assignee: Columbian Home Products, LLC, North Barrington, IL (US)

( * ) Notice: Subject to any disclaimer, the term of this patent is extended or adjusted under 35 U.S.C. 154(b) by 0 days.

(21) Appl. No.: 14/818,905

(22) Filed: Aug. 5, 2015

(65) Prior Publication Data

US 2017/0036340 A1    Feb. 9, 2017

(51) Int. Cl.
*B25G 1/10* (2006.01)
*B25G 3/36* (2006.01)
*A47J 27/00* (2006.01)
*B65D 25/28* (2006.01)

(52) U.S. Cl.
CPC ............ *B25G 1/102* (2013.01); *A47J 27/002* (2013.01); *B25G 3/36* (2013.01); *B65D 25/2817* (2013.01)

(58) Field of Classification Search
CPC ... B25G 1/102; B25G 1/10; B25G 3/36; A47J 27/002; A47J 45/061; A47J 45/06; B65D 25/28; B65D 25/2802; B65D 25/2805; B65D 25/2817

USPC ....... 220/759, 755, 752, 912, 573.1; 16/425, 16/422, 430
See application file for complete search history.

(56) References Cited

U.S. PATENT DOCUMENTS

| | | | | |
|---|---|---|---|---|
| 5,373,608 A | * | 12/1994 | Welch | A47J 45/071 16/425 |
| 5,383,523 A | * | 1/1995 | Stamp | A01B 1/16 172/378 |
| 5,737,803 A | * | 4/1998 | Tisdale | A47J 43/288 16/430 |

OTHER PUBLICATIONS

Carlson II, Paul A.. "Ergonomic Cookware Handle, Professor Chu, Spring 2009". Wayback Machine, https://web.archive.org/web/20140514095535/http://www.pacts179.com/wp-content/downloads/Carlson_P_ergo_handle_documentation.pdf, Published on May 14, 2014, Final Concept.*

* cited by examiner

*Primary Examiner* — Robert J Hicks
(74) *Attorney, Agent, or Firm* — Seyfarth Shaw LLP

(57) ABSTRACT

A handle having ergonomic and heat dissipation properties. For example, the handle can include a cross section that is concave in a first direction at a position closest to a body to which the handle is attached, and concave in a second direction opposite the first direction at a position closest to the user's hand, opposite the body. The handle can include a base with a surface wider and taller than an extension coupled to the base, so that the handle can act as a heat sink and dissipate heat that would otherwise burn a user.

9 Claims, 6 Drawing Sheets

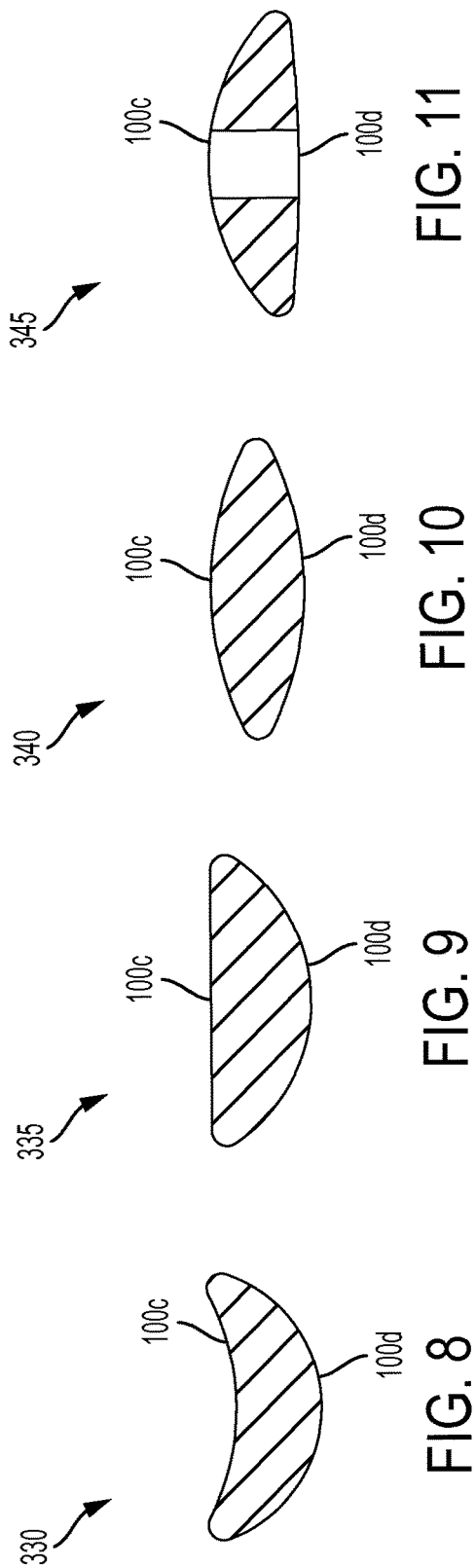

ERGONOMIC HANDLE

TECHNICAL FIELD OF THE INVENTION

The present invention relates generally to a handle. More particularly, the present invention relates to an ergonomic handle with heat sink properties for cookware.

BACKGROUND OF THE INVENTION

Handles are prevalent on many devices. For example, cookware can include a handle so the user can hold the cookware while it is positioned on a stove. The handle is coupled to the body of the cookware and allows the user to distance themselves from the heat applied to the body of the cookware.

Common conventional cookware often includes metallic handles connected to the cookware that heat up substantially when the cookware is heated. Users must therefore hold the handle with an oven mitt or towel, or wait until the handle cools to avoid being burned. Conventional handles are also simple and not ergonomically structured to a user's hand. Users are often forced to hold the handle with one hand and hold the body of the cookware with their other hand, for example, with an oven mitt.

SUMMARY OF THE INVENTION

An embodiment of the present invention broadly includes a handle that can be connected to a body, such as cookware, and that is structured in an ergonomic and heat dissipating manner. For example, the handle can include a cross section that is more concave at a position closest to the body, and more convex at a position closest to the user's hand, opposite the body. The handle can include a base that is coupled to the body and that includes a surface area wider and taller than an extension coupled to the base, allowing the handle to act as a heat sink and dissipate heat that would otherwise burn a user.

For example, an embodiment of the present invention broadly comprises a handle including a base and an extension. The extension has upper and lower opposing surfaces. The extension extends from the base and includes proximate and distal opposing ends. The extension further includes a first portion located near the proximate end, with the upper surface being concave at the first portion in a first direction, a second portion located between the proximate and distal ends, with the upper surface being substantially flat at the second portion, and a third portion located near the distal end, with the upper surface being concave at the third portion in a second direction opposite the first direction.

Another embodiment includes a handle having a base and an extension. The extension has upper and lower opposing surfaces. The extension extends from the base and includes proximate and distal ends. The extension further includes a first portion located near the proximate end, with the upper surface being concave at the first portion, a second portion located between the proximate and distal ends, with the upper surface being substantially flat at the second portion, a third portion located between the second portion and the distal end, with the upper surface and the lower surface being convex at the third portion, and a fourth portion located between the third portion and the distal end, with the upper surface being convex and the lower surface being less curved at the fourth portion as compared to the third portion.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

FIG. 8 is a cross-sectional view of the handle of FIG. 7, taken along line 8-8 in FIG. 7, according to an embodiment of the present invention.

FIG. 9 is another cross-sectional view the handle of FIG. 7, taken along line 9-9 in FIG. 7, according to an embodiment of the present invention.

FIG. 10 is another cross-sectional view of the handle of FIG. 7, taken along line 10-10 in FIG. 7, according to an embodiment of the present invention.

FIG. 11 is another cross-sectional view of the handle of FIG. 7, taken along line 11-11 in FIG. 7, according to an embodiment of the present invention.

DETAILED DESCRIPTION OF THE EMBODIMENTS

Figure 1:
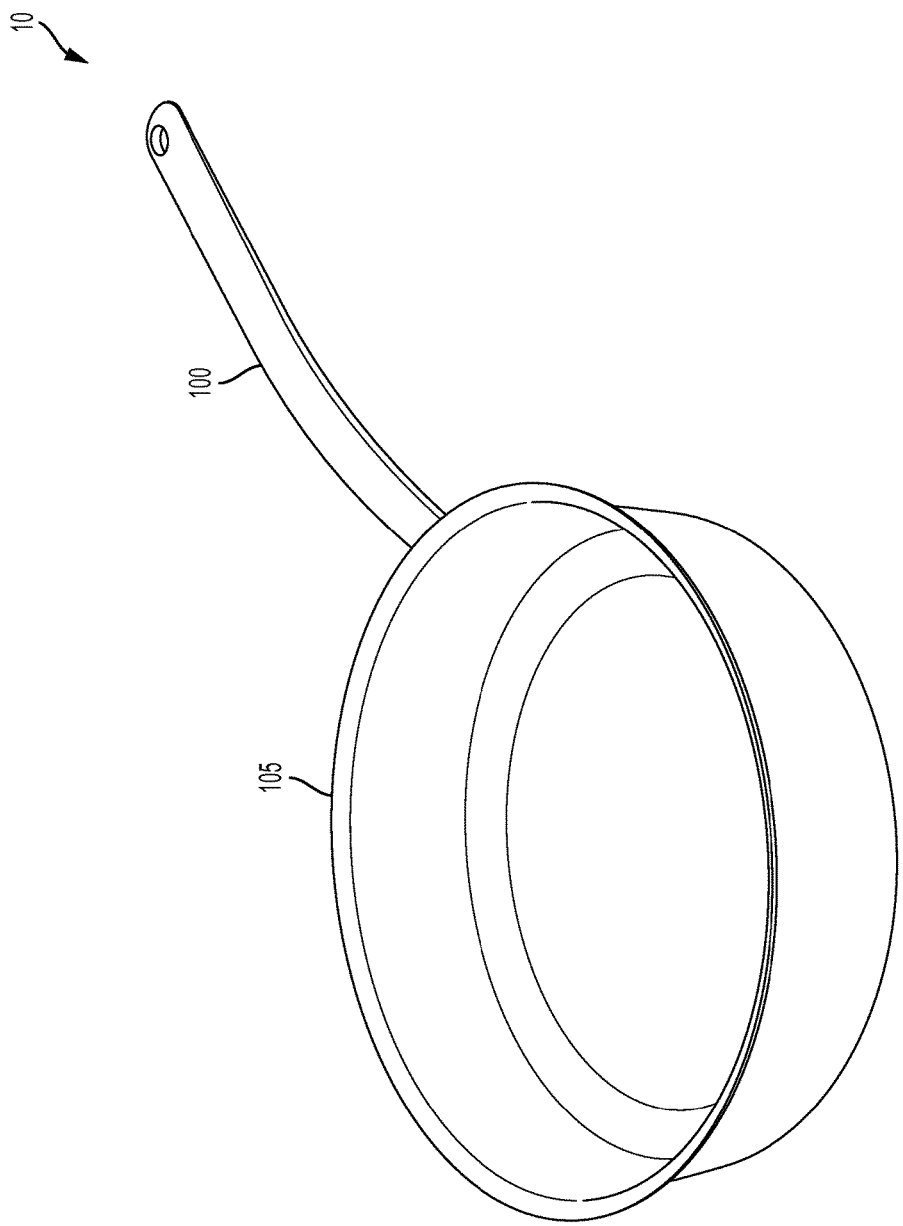
FIG. 1 is a front perspective view of a handle coupled to cookware according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

An embodiment of the present invention broadly includes a handle having ergonomic and heat dissipation properties. For example, the handle can have a cross section that is more concave at a position closest to the body, and more convex at a position closest to the user's hand, opposite the body. The handle can include a base having a surface area wider and taller than an extension coupled to the base such that the handle can act as a heat sink and dissipate heat generated from the body.

As shown in FIG. 1, one embodiment of the present invention includes cookware 10 having a handle 100 coupled to a body 105. For example, the body 105 can be a pan, saucepan, crepe pan, pot, Dutch oven, tea kettle, coffee brewer, or any other device that can benefit from the addition of a handle.

Figure 2:
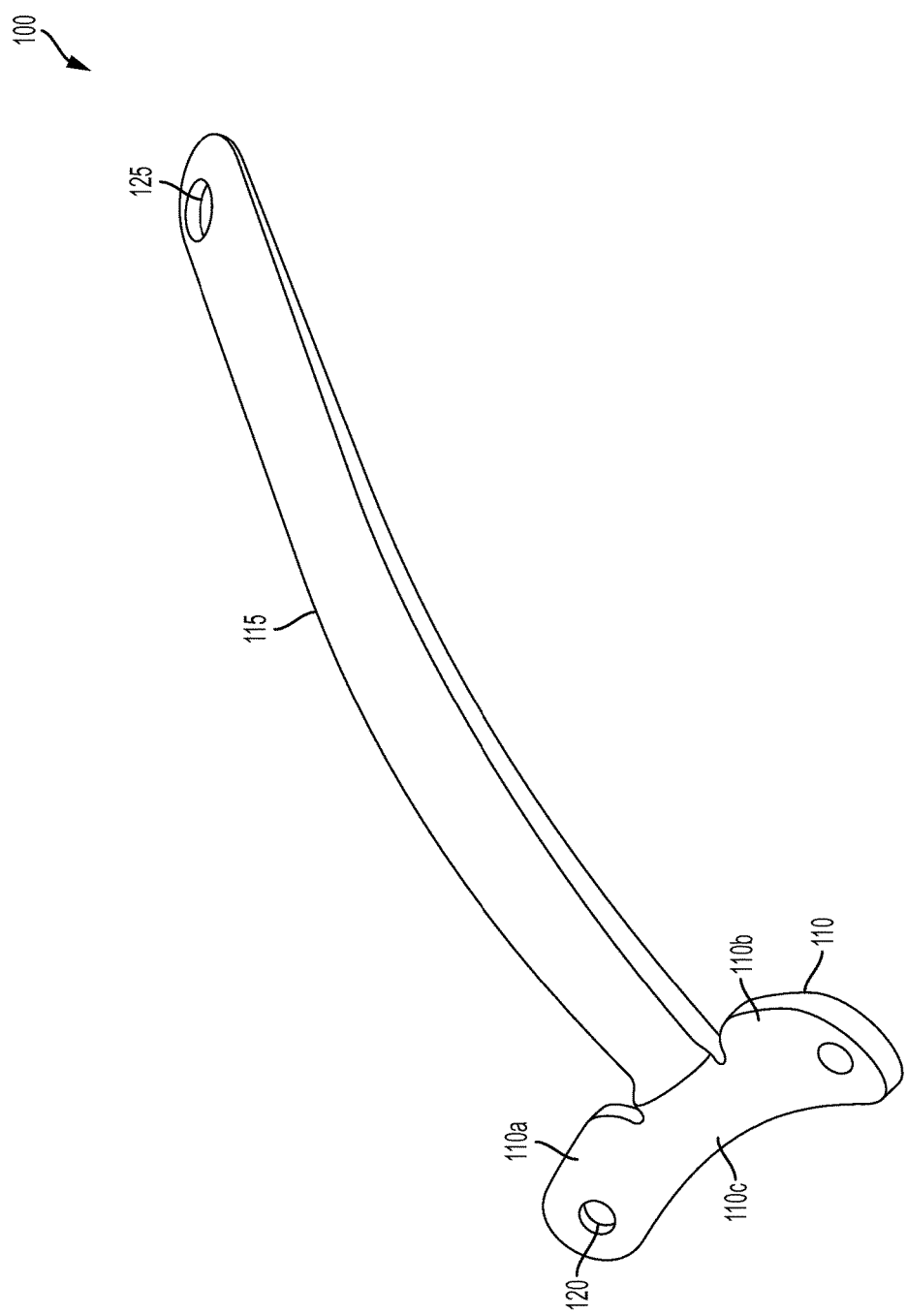
FIG. 2 front perspective view of a handle according to an embodiment of the present invention.

Referring also to FIG. 2, the handle 100 can include a base 110 and an extension 115 extending from the base 110. The base 110 can include holes 120 for coupling to the body 105, and the extension can include a hanger 125 located opposite the base 110, for hanging the handle 100, for example. Fasteners can be used to couple the handle 100 to the body 105 through the holes 120. The fasteners can be screws, rivets, or any other suitable fastener. It will be appreciated that the handle 100 can be coupled to the body 105 with any means, such as adhesion or weldment as well, without departing from the spirit and scope of the present invention.

Figure 3:
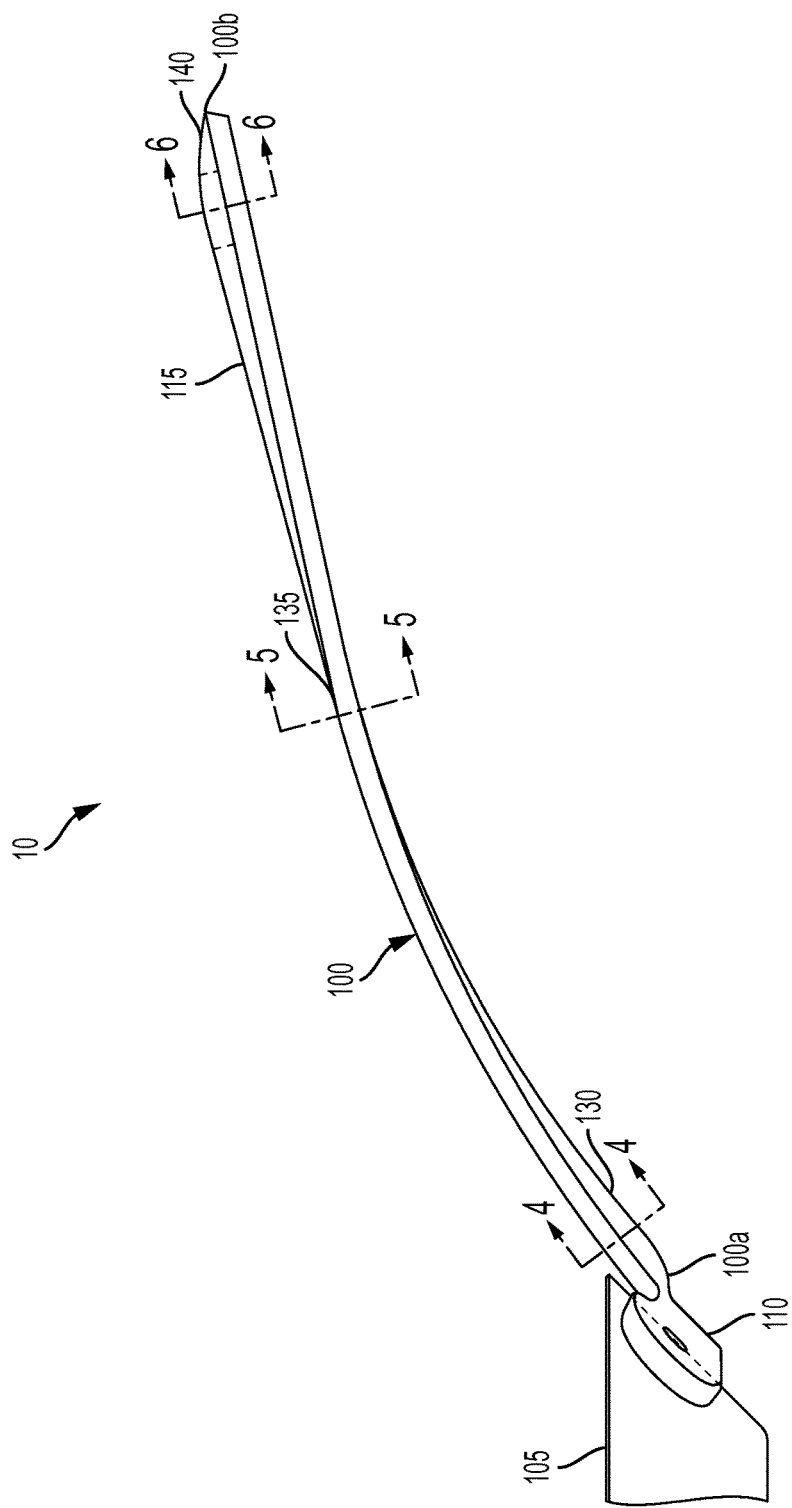
FIG. 3 is a side view of a handle coupled to a body according to an embodiment of the present invention.

Referring also to FIG. 3, the extension 115 extends from the base 110 at a proximate end 100a to an opposing distal end 100b. Near the proximate end 100a is a first portion 130 of the extension 115. Between the proximate end 100a and the distal end 100b is a second portion 135. Also, near the distal end 100b is a third portion 140.

Figure 6:
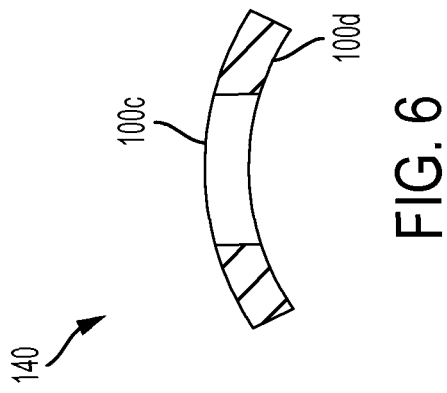
FIG. 6 is another cross-sectional view of the handle of FIG. 3, taken along line 6-6 in FIG. 3, according to an embodiment of the present invention.
Figure 5:
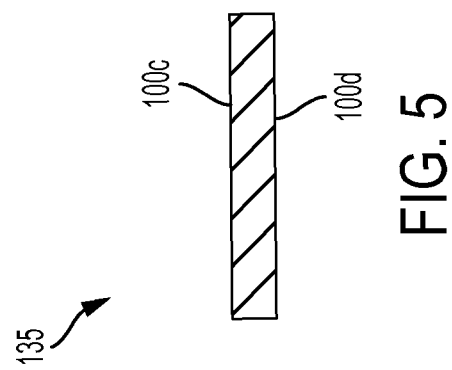
FIG. 5 is another cross-sectional view of the handle of FIG. 3, taken along line 5-5 in FIG. 3, according to an embodiment of the present invention.
Figure 4:
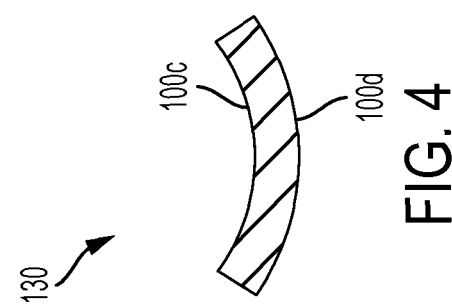
FIG. 4 is a cross-sectional view the handle of FIG. 3. as taken along line 4-4 in FIG. 3, according to an embodiment of the present invention.

Referring to FIGS. 4-6, the extension 115 of the handle 100 can be concave near the proximate end 100a, as shown in FIG. 4, with respect to the first portion 130. For example, the first portion 130 can have a top surface 100c that is curved in a concave manner in a first direction (e.g., curved upward), and a bottom surface 100d that is either flat or similarly curved to the top surface 100c. The extension 115 can then gradually become flat at the second portion 135, and then become concave in a direction opposite the first direction (e.g., curved downward) near the third portion 140. This structural configuration provides a grip that allows the user to ergonomically grip the handle 100 at the extension 115 near the third portion 140 due to the concave nature of the extension 115 at the third portion 140. Further, due to the concavity of the first portion 130, the extension 115 can release heat from the base 110 so that the heat does not carry towards the user's hand via convective heat transfer.

The base 110 can have a surface wider and taller than the extension 115 so that the handle 110 can act as a heat sink and dissipate heat that would otherwise burn a user. For example, referring to FIG. 2, the base 110 can have first 110a and second 110b wings extending from a midsection 110c to which the extension 115 is coupled. The first 110a and second 110b wings can be wider than the midsection 110c, and can therefore provide greater heat dissipation properties. In another embodiment, the handle 110 is coupled to the body 105 at an angle of approximately 15°. It has been determined that such an angle provides adequate distance of a user's hand from a heat source and provides an ergonomical grasp and comfort for lifting a heavier body.

Figure 7:
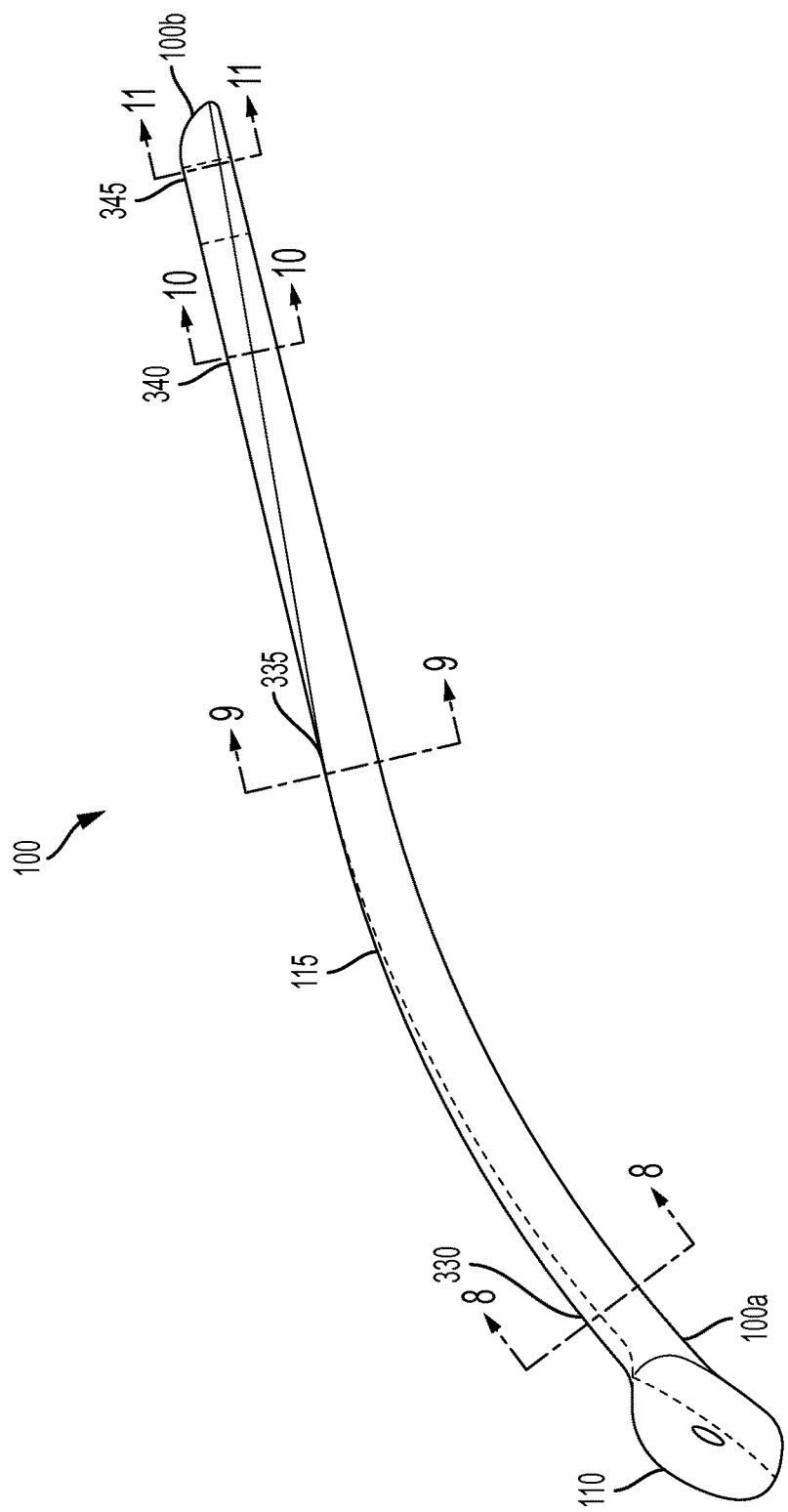
FIG. 7 is a side view of another embodiment of a handle.

Referring to FIG. 7, and similar to the embodiment shown in FIG. 3, the embodiment of FIG. 7 includes a first portion 330, second portion 335, third portion 340, and fourth portion 345 sequentially located between a proximate end 100a and distal end 100b of the extension 115. Sectional views of embodiments of the first 330, second 335, third 340, and fourth 345 portions are shown in FIGS. 8-11, respectively. As shown, the first portion 330 can be concave to allow for greater heat dissipation near the base 110. For example, the first portion 330 can have a concave, curved upper surface 100c and a convex, curved lower surface 100d. The second portion 335 can include a flat upper surface 100c and a convex lower surface 100d. The third portion 340 can include a convex upper 100c and lower 100d surface. The fourth portion 345 can have an upper surface 100c that is convex and a lower surface 100d that is either flat, or less curved than the lower surface 100d of the third portion 340. The upper 100c and lower 100d surfaces of the extension 115 of FIG. 7 therefore allow similar heat dissipation properties near the proximate end 100a, and greater ergonomic properties near the distal end 100b.

The handle 100 has been discussed herein as relating to cookware devices. However, the handle 100 can be implemented on any device, for example, cookware, tools, office equipment, automotive devices, luggage, machinery, or any other device or structure.

As used herein, the term "coupled" and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A handle comprising:
    a base; and
    an extension having opposing upper and lower surfaces, the extension extending from the base and including:
        opposing proximate and distal ends;
        a first portion located near the proximate end, wherein the upper surface is concave at the first portion;
        a second portion located between the proximate and distal ends, wherein the upper surface is substantially flat at the second portion; and
        a third portion located between the second portion and the distal end, wherein the upper and lower surfaces are convex at the third portion; and
        a fourth portion located between the third portion and the distal end, wherein the upper surface is convex and the lower surface is less curved at the fourth portion as compared to the third portion.

2. The handle of claim 1, wherein the lower surface is convex at the first portion.

3. The handle of claim 1, wherein the lower surface is convex at the second portion.

4. The handle of claim 1, wherein the lower surface is substantially flat at the fourth portion.

5. The handle of claim 1, wherein the base includes a midsection and a wing extending from the midsection, the extension being coupled to the midsection and the wing being wider than the midsection.

6. The handle of claim 5, wherein the base includes a hole adapted to receive a fastener and couple to a body.

7. The handle of claim 6, wherein the hole is defined within the wing.

8. A piece of cookware comprising:
    a body adapted to receive heat; and
    a handle coupled to the body and including:
        a base including a midsection and a wing extending from the midsection, the extension being coupled to the midsection and the wing being wider than the midsection, the wing having a hole adapted to receive a fastener and couple the handle to the body; and
        an extension having opposing upper and lower surfaces, the extension extending from the base and including:

opposing proximate and distal ends;
a first portion located near the proximate end, wherein the upper surface is concave at the first portion and the lower surface is convex;
a second portion located between the proximate and distal ends, wherein the upper surface is substantially flat and the lower surface is convex at the second portion; and
a third portion located between the second portion and the distal end, wherein the upper and lower surfaces are convex at the third portion; and
a fourth portion located between the third portion and the distal end, wherein the upper surface is convex and the lower surface is less curved at the fourth portion as compared to the third portion.

9. The cookware as claimed in claim 8, wherein the handle is coupled to the body at an angle of about 15°.

* * * * *